Dec. 12, 1939.  J. D. RIESER  2,183,267
VARIABLE SPEED TRANSMISSION
Filed Aug. 8, 1938  2 Sheets-Sheet 1
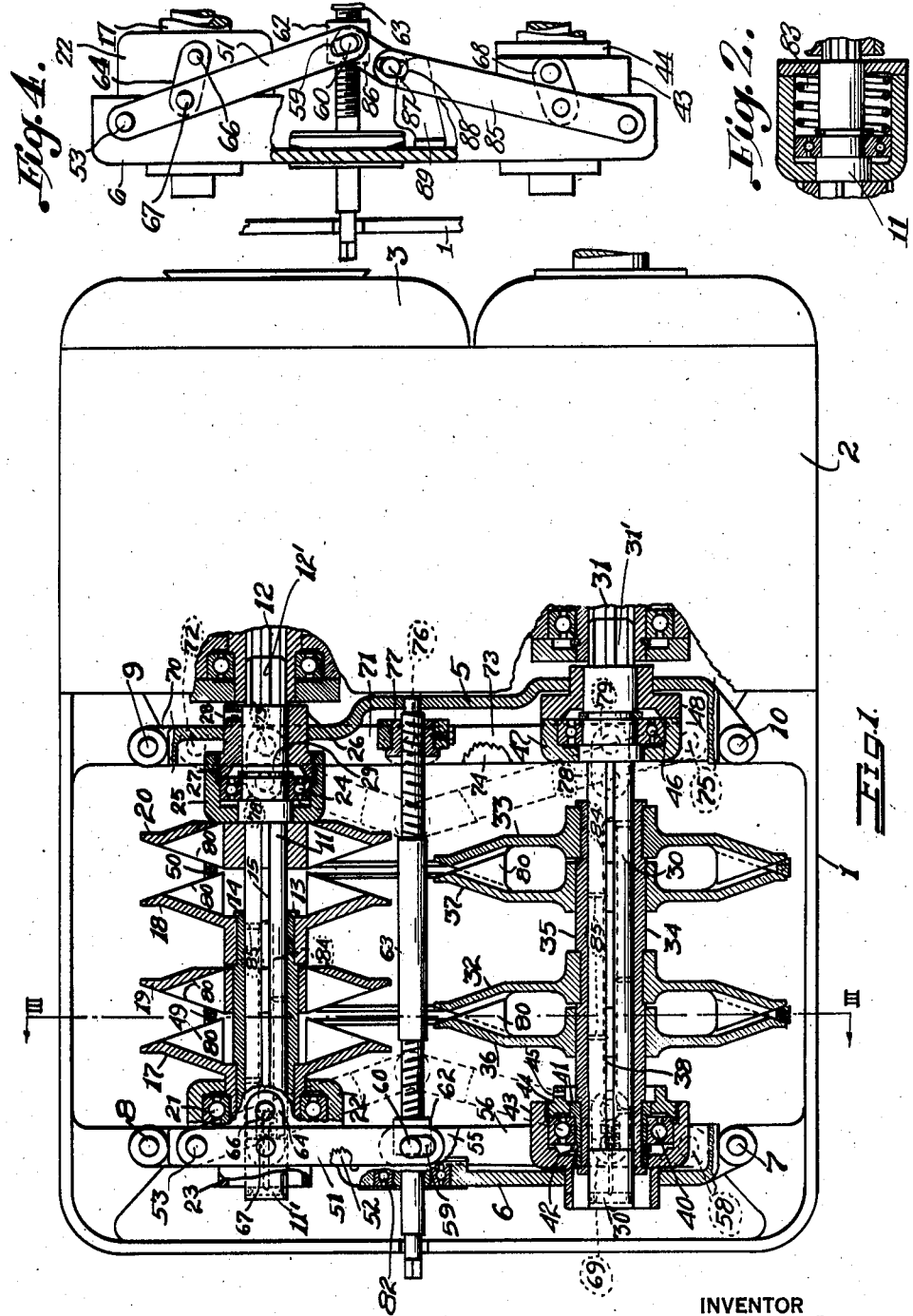
INVENTOR
John D. Rieser.
BY
John H. Morgan
ATTORNEY

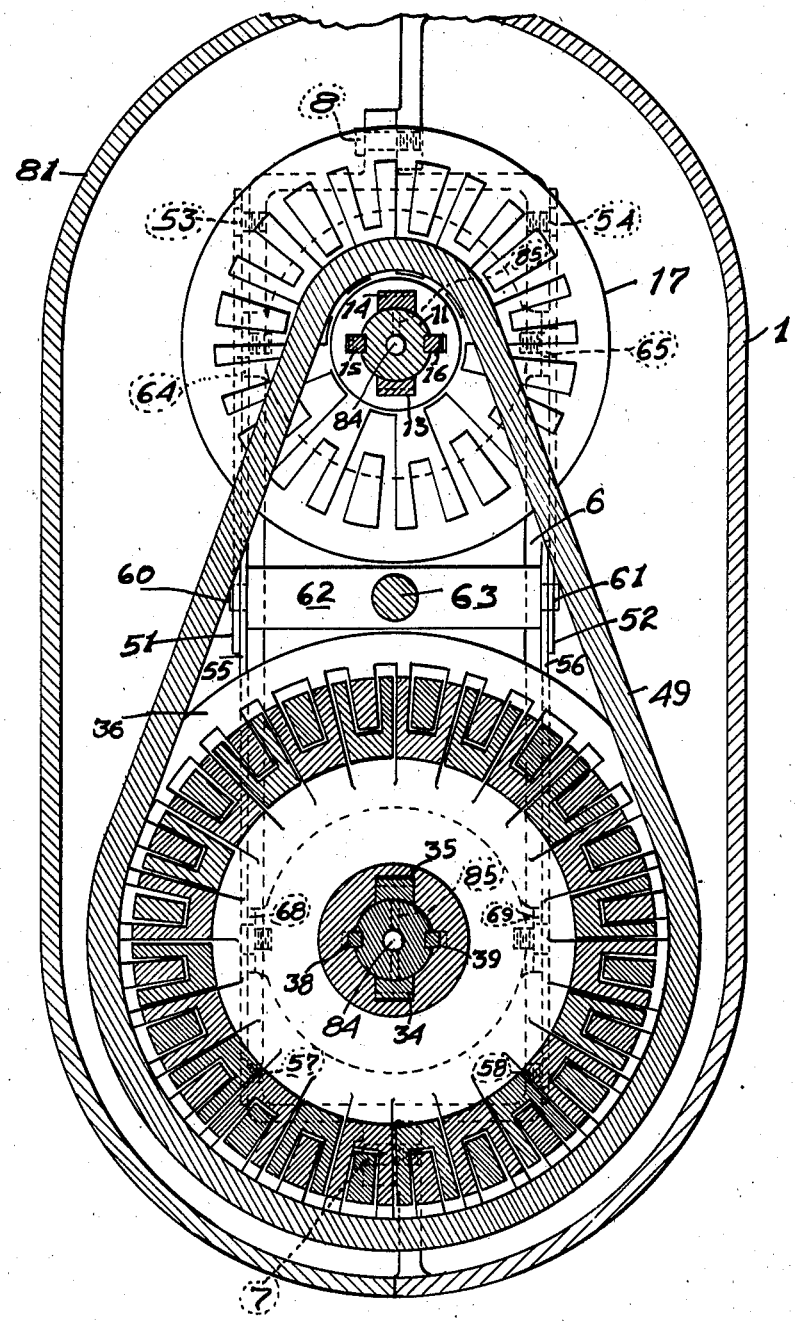

Patented Dec. 12, 1939

2,183,267

UNITED STATES PATENT OFFICE 2,183,267

VARIABLE SPEED TRANSMISSION

John D. Rieser, Berkeley, Calif.

Application August 8, 1938, Serial No. 223,759

19 Claims. (Cl. 74—230.17)

This is a continuation-in-part of my prior application Serial No. 696,483 filed November 3, 1933. The present case contains all of the subject matter of said prior application.

This invention relates to variable speed transmission devices, and more particularly, to that class of transmission devices in which speed is changed by varying the diameters of cooperating sheaves driven by a belt to obtain a desired ratio of speed between a driven sheave and a driving sheave.

One of the objects of the present invention is to provide means for locating one of a pair of telescoping sheave halves by members providing shoulders to allow for a fixed spacing for the sheave halves, or mounting the other half of the pair on the shaft with feathered keys having shoulders thereon to provide a fixed spacing, so that one sheave half of each pair of the sheaves is fixed relative to the other to prevent motion thereof, while the sheave halves so located can be varied relative to one another as a unit.

Another object is to provide means for taking up slack in the transmission belts due to stretching or wear thereof.

Another object of the invention is to have a variable speed unit detachable from the housing as a unit to allow for easy replacement of the endless belt or belts and to permit the ready substitution of a new variable speed unit without disturbing either the motor or an associated gear unit.

Another object of the present invention is to provide means for varying the speed by means of an arrangement of links and a threaded rod.

Another object of the present invention is to provide an oiling system for the slidable quill members and sheaves.

A further object of the invention is to provide an improved construction, to reduce the cost of manufacture, and to provide a variable speed unit which can be readily assembled.

Other objects of the invention will appear to those skilled in the art to which the invention appertains, as the description hereinafter set forth progresses.

Another object of the present invention is to provide means for ensuring (1) that a substantially constant belt tension is maintained and (2) that the cooperating grooves are in alignment throughout the range of adjustment of the variable sheaves. While others have employed adjustable sheave reducers heretofore, their adjustment has not given positively a fixed required movement of one set of sheave halves to other set corresponding to the required sheave half movements called for to maintain substantially constant belt distance around the two sets of sheaves on the two shafts over the range of the variable unit. Due to the angle of belt contact entering into consideration and with this angle differing for each adjustment over the entire range, it is necessary to shift one set more proportionately than the other to maintain a substantially constant length belt path and substantially constant belt tension. This movement is such that each sheave set is positively moved at a rate which varies over the range of adjustment and is different from and is not in a straight line relation to the rate of the other sheave set.

An embodiment of the invention is shown in the accompanying drawings, in which the same reference numerals are applied to the same parts throughout the several views, and of which there may be modifications.

Figure 1 shows a plan view of the variable speed unit connected to a motor and a gear reduction unit, the transmission unit being in section with the cover removed, while the motor and gear units are only partly in section.

Figure 2 shows a modified form of the means for adjusting the shafts or sheave units longitudinally.

Figure 3 is a section taken on the line 3—3 of Figure 1 on a larger scale.

Figure 4 is a fragmental plan view of a portion of a modified speed change unit.

A suitable housing 1 is provided for the transmission unit. This housing has a removable cover 81. Within this housing are mounted the gear unit 2 and the prime mover, such as electric motor 3. Power is derived from the unit through the power take-off shaft 4.

The transmission unit is carried by and supported in a frame which includes members 5 and 6. Bolts 7, 8, 9 and 10 are employed to position and retain this frame in the housing. Mounted in the frame and connected to the motor shaft 12 by spline keys 12' is a shaft 11. Mounted upon the shaft 11 are quill members 13 and 14. These members are shown as separate elements in the drawings, but they can be connected together in any suitable way.

The quill members are slidable on the shaft, and carry sheave halves 17 and 18. These sheave halves are engaged with the quill members as by shoulders which engage the hubs of each of the sheave halves. The quill members merely act as means for sliding the sheave halves 17 and 18, the hubs of these sheaves bearing upon and sliding upon the shaft 11. A shoulder formed upon each of the quill members provides a positive location for a sheave half, and once this sheave is in place it is definitely located. Of course, the shoulder may or may not extend across the entire face of the spacing members.

Cooperating sheave halves are provided for the halves 17 and 18 previously mentioned. These halves are indicated at 19 and 20, and are engaged by shoulders formed on the feathered keys 15 and 16 so that these sheave halves slide with the shaft 11. The hubs of these sheave halves also bear upon the shaft, while sheave half 19 is slidable on the quill members 13 and 14.

The sheave half 17 is provided with a ball bearing 21 which is mounted on the hub thereof. The bearing 21 is supported within the housing 22 carried on the frame 6 by the sleeve 23, which also provides a cap for the bearing housing, the reduced portion thereof extending through the frame 6. The other end of the shaft 11 is provided with a ball bearing 24 which is supported by sleeves 25 and 26. These sleeves are coupled together by screw threads 27 so that the shaft can be adjusted longitudinally by turning the sleeve 26, suitable holes 28 being provided in the sleeve for a spanner or pin. Split ring 29 cooperates with a groove formed upon the shaft 11 to keep the ball bearing in place against the shoulder on the shaft.

A cooperating sheave structure is provided opposite to and in a parallel relationship to those on the shaft 11. Thus, parallel shaft 30 is mounted in alignment with and is connected to a shaft 31 by spline keys 31'. This provides a connection to the gear box 2, although shaft 31 can extend beyond the housing as the direct power take-off shaft. In this case, sheave halves 32 and 33 are slidable with the quill members 34 and 35 on the shaft, while the other halves 36 and 37 slide with the shaft, being secured thereto by feathered keys 38 and 39. The hubs of halves 36 and 37 are of course slidable over the quill members.

Shaft 31 is mounted in a ball bearing 40 carried on a sleeve 41 which fits between the shoulders on the quill members and bears on the shaft. A split ring 42 holds the bearing in place.

Nut 44 cooperates with the sleeve 43 to move the quill members longitudinally when the nut is turned by means of a spanner or pin inserted in hole 45. The other end of shaft 30 is supported by ball bearing 46 mounted on sleeves 47 and 48 in the frame 5.

Means are provided for varying the relationship between the sheave halves by operating the slidable quill members and shafts to vary the ratio between the cooperating sheave units and thus vary the driving effected through belts 49 and 50. The operating means comprises links 51 and 52 pivoted on the frame 6 at 53 and 54, and links 55 and 56 pivoted on the lower part of frame 6 at 57 and 58. The links are provided with a slot 59 in the free ends thereof. These slots are engaged by pins 60 and 61 on the block 62. A threaded rod 63 is extended through the block 62, the rod carrying a left hand thread at one end and a right hand thread on the other end, so that rotation of the rod in a selected direction is effective to move the link pairs either toward or away from each other. Links 64 and 65 are connected by pivots 66 and 67 to the sleeve 22, which is effective to move the quill members 13 and 14. Similarly, links 68 and 69 connect the sleeve 43, which is effective to move the quill members 34 and 35 upon shaft 30. Other like links are provided at the other ends of shafts 11 and 30, these links being designated 70 and 71 pivoted at 72 to the upper part of frame 5, and links 73 and 74 pivoted at 75 to the lower part of frame 5. The link ends are provided with slots similar to those shown. Links 70 and 71 are slotted in the same manner as links 55 and 56 to engage the pins 76 on the block 77, which is engaged by the threads on the rod 63. Short links 78 connect the vertical links to the shafts so that the shafts can be moved through pivot 79.

In operation, the rod 63 is turned in its bearings 82 in the frame 6 and 5. This causes the blocks 62 and 77 to travel along the rod to swing the links on their pivots. This action is attained through the short links which act to slide the quill members along the shaft carrying the half sheaves 17 and 18 and 32 and 33. At the same time that the shafts are moved, the half sheaves 19, 20 and 36 and 37 are carried along. The half sheaves 17 and 19 are moved toward each other, for example, causing the ribs thereof to telescope together or intermesh, while the pairs of half sheaves 36 and 32, for example, are moved away from each other, causing the ribs to separate to reduce the diameter of the belt surface. This of course causes an increase in the diameter of the corresponding pair of half sheaves on shaft 11. Each sheave pair on each of the shafts is moved in a manner similar to that of the associated sheave halves disclosed.

In the drawings, the sheaves on shaft 30 have been shown as somewhat larger in diameter than those on shaft 11. This differential is cared for by having the links that operate the larger diameter sheaves longer between the pivots than the links which operate the sheaves of smaller diameter.

It is a further feature of the structure of the present invention that a belt can be readily replaced without greatly disrupting the unit. Thus, by releasing and removing bolts 7, 8, 9 and 10, the members 5 and 6, providing a frame supporting the speed change unit, are released and can be removed without disrupting the alignment of the shafts, bearings and pulleys. A new belt can be inserted in place by placing one section of the belt over one end of the frame and against the shaft or the exterior hub of the pulley or the bearing housing. The other section of the belt is then passed over the other end of the frame, member 5, for example. Thus, so long as the inner perimeter of the belt is greater than the distance about the shaft or exterior pulley hub or bearing housing and over the other frame end, the belt can be inserted or removed. When the belt is passed over the other frame end it can be worked into place on the pulleys by inserting it in place on one pulley and working it up and over the side of the other.

Means are provided for oiling the sliding sheaves and quill members. This means comprises a central hole 84 in the shafts 11 and 30. Connecting holes 85 are filled with a porous wicking to allow lubricant to wet the sliding surface. To fill the openings with wicking and lubricant, the cap 11' is provided on shaft 11, and cap 30' on shaft 30. These caps have reduced portions which engage threads in the ends of the shafts. The oil holes extend into the cap portion.

In the modified form of device shown in Figure 2, movement of the quill members is effected automatically through spring 83, which is effective to act in the ball bearing to move it with the shaft to quill members and then take up the slack in the belts.

It has been previously pointed out herein that links 51 and 52, and links 55 and 56, are each provided with a slot 59 in the free end thereof, and that these slots are engaged by pins 60 and 61 on the block 62. Provision of the pin and slot connection permits the sheaves to be moved to provide various drive ratios between the driving and driven shafts and, at the same time, ensure substantially uniform tension on the belt for any ratio; thus, the pin and slot connection enables one sheave pair to move a greater distance than the other sheave pair for a given change in the ratio of speed change.

In Figure 4 I have shown a slightly modified form of device in which links 51 and 52 are connected to block 62 by means of slot 59 and pins 60 and 61. The links corresponding to 55 and 56 in Figure 1 are designated as 85. However, links 85 terminate short of connection to the pins 60 and 61 and instead short links 86 are carried on the block 62 rotatably supported on pins 60 and 61. The free ends of links 86 carry pins 87 which are inserted into a slot 88 in links 85. The pins 87 ride along the face of a cam 89 which is supported on the side frame 6 of the machine. The contour of this cam is such that it corresponds to the difference in movement between the sheave faces upon change in ratio of the sheaves to effect the change in speed. For any given position of pin 87 along the cam 89, the required belt path length will be substantially the same as at any other position. The cam face 89 controls differential movement, causing one pair of sheaves to move at a variable rate different from the rate of movement of the other pair. Substantially equal movement proportionately of the sheaves results in unequal belt tension and it is accordingly necessary to move the sheave halves relative to each other unequally proportionately to secure a substantially constant path length. The movement can be calculated by taking into account the size of the sheaves relative to each other and the center spacing of the shafts carrying the sheaves.

In place of a cam any other form of device can be employed to impart the necessary motion.

I claim:

1. A variable speed transmission of the class described comprising a frame, a pair of spaced parallel shafts journaled with fixed centers in said frame, quill members on said shafts, recesses forming shoulders on said quill members, a pair of telescoping sheaves having hubs on each shaft, one half of a telescoping sheave on each shaft having its hubs in said recesses, the other half of said sheaves being mounted on the shafts and slidable on said quills, V grooves formed by the telescoping sheaves, and means to move the quill members and the shafts simultaneously to cause one pair of half sheaves to telescope together and the other pair to separate whereby the V grooves will increase in diameter in one pair and decrease in the other.

2. A variable speed transmission of the class described comprising a housing, a pair of detachable end frames spaced in said housing, a drive shaft and a driven shaft journaled in parallel relation on fixed centers in said end frames, quill members on each shaft, recesses forming shoulders on the quill members, one half of a telescoping sheave on each shaft having hubs in said recesses and slidable on said shafts, feather keys on said shafts, shoulders on said keys, the other half of said sheaves fixed on said key shoulders and on said shafts, a right and left hand threaded rod mounted in said end frames, a block having threads to engage the threads of said rod, pivoted links connecting said blocks to said quill members and said shafts whereby the rotation of the rod will cause the quills on a shaft and such shaft to move towards each other in one shaft assembly and away from each other in the other shaft assembly whereby the halves of one sheave will telescope together and the halves of the other sheave will separate.

3. A variable speed transmission of the class described comprising a housing, a pair of spaced detachable frames mounted in said housing, a drive shaft and a driven shaft journaled in parallel relation on fixed centers in said frames, slidable quill members on each shaft, spaced recesses in said quill members, a plurality of pairs of telescoping sheaves on said shaft, one half member of each pair fixed in said recesses, feather keys in said shafts, recesses in said keys, the other half member of said sheaves fixed on the shafts in said key recesses, and means to move the quill members and the shafts simultaneously to cause the sheave halves on one shaft to telescope and the sheave halves on the other shaft to separate.

4. A variable speed transmission of the class described comprising a housing, a pair of spaced detachable frames mounted in said housing, a pair of spaced parallel shafts journaled in said frames on fixed centers, slidable quill members on said shafts, spaced recesses on said quill members, feather keys having spaced recesses on said shafts, a plurality of pairs of telescoping sheaves, one half of each pair fixed in the recesses of said quill members, and the other half of the pair being fixed on the shafts and in the spaced recesses in said keys, and a threaded rod and links connected to the quill members and shafts to simultaneously move the quill members and shafts to bring the halves of each pair of sheaves together on one shaft and move the halves on the other shaft away from each other.

5. A variable speed transmission of the class described comprising a housing, a detachable frame in said housing, a pair of parallel shafts journaled in said frame on fixed centers, quill members having spaced recesses mounted on said shafts, one half of each pair of a plurality of pairs of telescoping sheaves fixed on said quill members in said recesses, the other half of said pairs of sheaves being fixed on the shafts and spaced by recesses in feather keys on said shaft, means to move the quill members and the shafts in opposite directions whereby the pairs of sheaves on one shaft are telescoped and the pairs of sheaves on the other shaft are separated so that the diameters of one set of sheaves is increased and decreased in the other set, transmission belts for said sheaves, and adjustable means to increase the diameters of both sets of sheaves to take up the stretch of the belts.

6. A variable speed transmission of the class described comprising a housing, a pair of detachable frames spaced in said housing, a drive shaft and a driven shaft journaled in spaced parallel relation on fixed centers in said frames, quill members on each shaft, spaced recesses on said quill members, feather keys having spaced recesses and set in keyways in said shafts, a plurality of pairs of telescoping sheaves on each shaft, the sheaves on one shaft being of larger diameter than those on the other shaft, one half of each pair of sheaves fixed in the recesses of said quills, and the other half of each pair fixed in the recesses of said feather keys, means to move the quills and shafts in opposite directions to each other on each shaft to cause the sheaves on one shaft to increase in diameter and the sheaves on the other shaft to decrease in diameter, belts for said sheaves, means for differentially moving the sheaves of different diameters on said shafts, automatic spring take-up to adjust the quills in relation to one shaft, and automatic take-up to adjust the other shaft in relation to the quills so that the tension of the belts may be automatically adjusted.

7. A variable speed transmission of the class described comprising a frame, a drive shaft and a driven shaft, journals in said frame for an end of each shaft, said shafts and journals slidable in said frame, quills on an end of each shaft, said quills being journaled in said frame, means to slide said quills on said shaft, keys in said shaft, space being provided on the shaft between said quills for the location of said keys, one or more pairs of intermeshing half sheaves, one member of each pair fixed to said shaft and spaced by recesses in said keys, the other member of said half sheave being fixed to said quills in spaced recesses in said quills and sliding on said shaft whereby the movement of said slidable quills and shaft will cause the pair of sheaves on one shaft to come together, and the sheaves on the other shaft to separate, one or more belts for said sheaves to transmit power from one of said shafts to the other.

8. The combination in a variable speed transmission comprising a frame, a drive shaft and a driven shaft journaled in parallel relation in said frame, a plurality of pairs of cone shaped discs on each shaft in alignment with each other, the faces of said discs forming V grooves for belts, sliding members having locating shoulders for sheave halves at each of said shafts, said sliding members joined to one disc of each pair of discs located by said shoulders to connect said half discs as a unit on each shaft and said sliding members being joined to inclosed bearings, said bearings being part of shifting mechanism to move said sliding members on both of said shafts, said shifting mechanism being independent of shaft rotation whereby the movement of said sliding members with sheave halves will give infinite changes of diameter of said V grooves for said belts within range of the unit.

9. In combination in a variable speed transmission comprising a frame, a drive shaft and a driven shaft journaled in parallel relation, a plurality of pairs of cone shaped discs on each shaft, the faces of said discs adapted to form V grooves for belts, belts for said V grooves to transmit power, one disc of each pair of said discs being fixed by connecting members to prevent motion of these discs in relation to one another but to effect action thereof as a unit on each shaft, each unit being joined to an enclosed bearing, said bearing being part of shifting mechanism to move said unit, and said shifting mechanism including means to maintain alignment and substantially equal tension on the belt within the range of the variable unit.

10. In combination a variable speed transmission comprising a housing, a frame in said housing, a pair of parallel shafts journaled in said frame, cone shaped discs on each shaft in pairs, the faces of said discs cooperating to form V grooves of varying diameter for belts, endless belts for said V grooves to transmit power, one disc of each pair of said discs joined to an enclosed bearing to form a unit, said bearing being part of shifting mechanism to move said unit, said shifting mechanism cooperating to maintain simultaneously alignment of said V grooves on both shafts and substantially equal tension on said belts, the frame being of such size relative to the internal perimeter of the belts as to permit the belts to be slipped over the frame.

11. In combination, support means, a frame including spaced members, means securing said frame on said support means, a first shaft, a second shaft, bearings journalling said shafts on said spaced members in a spaced parallel relationship, a pair of substantially cone shaped discs on said first shaft aligned and cooperating to provide a first substantially V groove sheave of variable size, a pair of substantially cone shaped discs on said second shaft aligned and cooperating to provide a second substantially V groove sheave of variable size, said sheaves being aligned to cooperate for driving one from the other, a belt of substantially fixed internal perimeter extended about said V groove sheaves, linkage means for moving in a variable manner the cooperating pairs of discs to vary said grooves while maintaining said grooves in alignment and of such a cooperative size as to maintain a substantially constant belt path length, one of said members being of a length relative to said perimeter whereby said belt can be inserted and removed over said frame and sheaves without upsetting the assembly of said bearings, shafts, and discs.

12. In combination, a first shaft, a second shaft, bearings journaling in said shafts in spaced parallel relationship, a pair of substantially cone shaped discs slidably mounted on each of said shafts and aligned cooperatively to provide a substantially V groove sheave of variable effective diameters on each of said shafts, a wedge acting belt of substantially fixed internal perimeter extended about and wedging against faces of said cone shaped discs at effective diameters of said V groove sheaves, and linkage means for positively moving cooperating pairs of said discs to change the effective size of one pair relative to the other in a variable manner to effect a speed change while maintaining a substantially constant belt path length about said effective sheave diameters, said linkage means having a group of surfaces thereon and cooperating with said half discs whereby the belt wedge acting forces are transmitted to said group of surfaces in substantially the same direction during rotation of said shafts at all the varying adjustments of said linkage means to thereby obviate upsetting of the specific aforesaid function of said linkage means by the wedge action forces of said belt.

13. In combination, a first shaft, a second shaft, bearings journaling said shafts in spaced parallel relationship, a pair of substantially cone shaped discs slidably mounted on each of said shafts aligned cooperatively to provide a substantially V groove sheave of variable effective diameters on each of said shafts, a wedge acting belt of substantially fixed internal perimeter extended about and wedging against faces of said cone shaped discs at effective diameters of said V groove sheaves to transmit power, and linkage means for moving cooperating pairs of discs to vary the effective diameters of said sheaves while maintaining the grooves in said sheaves substantially in alignment, said moving means including members for effecting a positive proportional movement in variable manner to said pairs to effect a speed change and to maintain substantially constant belt path length about said effective sheave diameters, said linkage means members for effecting movement in variable manner having a group of surfaces thereof cooperating with said half discs whereby said belt wedge acting forces are transmitted to said group of surfaces during rotation of said shafts at all the varying adjustments of said linkage means whereby said constant belt path length is unaffected by said varying adjustments and varying wedge acting forces of said belt.

14. In combination, a first shaft, a second shaft, bearings journaling said shafts in spaced parallel relationship, a pair of substantially cone shaped discs slidably mounted on each of said shafts aligned cooperatively to provide a substantially V groove sheave of variable effective diameters on each of said shafts, a wedge acting belt of substantially fixed internal perimeter extended about and wedging against faces of said cone shaped discs at effective diameters of said V groove sheaves to transmit power, and linkage means for moving cooperating pairs of discs to vary the effective diameter of said sheaves while maintaining the grooves in said sheaves substantially in alignment, said moving means including members for effecting said movement in variable manner to effect speed change and maintain substantially constant belt path length about said effective sheave diameters, said moving means members for effecting movement in variable manner having a group of surfaces thereof cooperating with said half discs whereby said wedge acting forces are transmitted to said group of surfaces during rotation of said shafts at all the varying adjustments of said moving means and the maintenance of said constant belt path length is independent of varying wedge action forces of said belt and of said varying adjustments.

15. In combination, a first shaft, a second shaft, bearings journaling said shafts in spaced parallel relationship, a pair of substantially cone shaped discs slidably mounted on each of said shafts aligned cooperatively to provide a substantially V groove sheave on each of said shafts, a belt of substantially fixed internal perimeter extended about effective diameters of said V groove sheaves, linkage means for positively moving in a variable manner cooperating pairs of said discs to change the effective size of one pair relative to the other in a variable manner to effect a speed change while maintaining a substantially constant belt path length about said sheaves, and means for changing the effective size of said sheave grooves to control the slack in said belt independently of said linkage means while retaining the said proportional movement necessary to maintain constant belt path length at varying adjustments and thereby obviate upsetting of the specific aforesaid functions of said linkage means.

16. In combination, a first shaft, a second shaft, bearings journaling said shafts in spaced parallel relationship, a pair of substantially cone shaped discs slidably mounted on each of said shafts aligned cooperatively to provide a substantially V groove sheave on each of said shafts, a belt of substantially fixed internal perimeter extended about effective diameters of said V groove sheaves to transmit power, linkage means for moving cooperating pairs of said discs to vary the effective diameters of said V groove sheaves while maintaining grooves in said sheaves substantially in alignment, said moving means including members for effecting a sustained proportional movement in a variable manner in said pairs to effect a speed change with said belt and maintain a substantially constant belt path length, and means for changing the effective size of said sheave grooves to control the slack in said belt independently of said linkage means while retaining the said proportional movement necessary to maintain constant belt path length and alignment of the sheave grooves at the varying speed adjustments and thereby obviate upsetting of the specific aforesaid functions of said linkage means.

17. In combination, a first shaft, a second shaft, bearings journaling said shafts in spaced parallel relationship, a pair of substantially cone shaped discs slidably mounted on each of said shafts aligned cooperatively to provide a substantially V groove sheave on each of said shafts, a belt of substantially fixed internal perimeter extended about said V groove sheaves, and linkage means movable positively (1) to change the effective size of one pair of said discs relative to the other pair of said discs to effect a speed change and (2) to maintain simultaneously a substantially constant belt path length about said sheaves irrespective of the speed change effected, a first means independent of said linkage means for moving on the first shaft a selected one of the pair of discs toward the other disc and a second means independent of said linkage means for moving on said second shaft the like positioned disc to said selected disc in the other pair of said discs toward the other disc.

18. In combination, a first shaft, a second shaft, bearings journaling said shafts in a spaced parallel relationship, a first pair of substantially cone shaped discs slidably mounted on said first shaft providing a first V groove sheave of variable effective diameter, a second pair of substantially cone shaped discs slidably mounted on said second shaft providing a second V groove sheave of variable effective diameter, a belt of substantially fixed internal perimeter extended about said first and said second V groove sheaves, linkage means for moving said disc pair on said first shaft at a variable rate of movement over the range of movement of said disc pair effected by movement of said linkage means, other linkage means mechanically independent of the first mentioned linkage means for moving said disc pair on said second shaft at a variable rate of movement over the range of movement of said disc pair effected by movement of said other linkage means, an operator operated means common to both said linkage means for moving both said linkage means simultaneously to effect speed change between said shafts while maintaining said sheaves in alignment and substantially constant belt path length about said sheave grooves on said shafts, means for sliding one disc of said first pair of discs in a selected direction relative to the other on said first shaft, and means for sliding in the same direction that one of said second pair of discs on the second said shaft corresponding to the aforesaid one of said first pair whereby the aforesaid function of said linkage means and operator operated means is maintained.

19. In combination, a first shaft, a second shaft, bearings journaling said shafts in a spaced parallel relationship, a pair of substantially cone shaped discs slidably mounted on said first shaft providing a first V groove sheave of variable effective diameter, a pair of substantially cone shaped discs slidably mounted on said second shaft providing a second V groove sheave of variable effective diameter, a belt of substantially fixed internal perimeter extended about said V groove sheaves, linkage means for moving said disc pair on said first shaft at a variable rate of movement over the range of movement of said disc pair effected by movement of said linkage means, other linkage means mechanically independent of the first mentioned linkage means for moving said disc pair on said second shaft at a variable rate of movement over the range of said disc pair effected by movement of said other linkage means, and an operator operated means common to both said linkage means for moving both said linkage means simultaneously and effect a speed change between said shafts while maintaining said sheave grooves in alignment and maintaining substantially constant belt path length about the effective diameters of said sheaves on said shafts.

JOHN D. RIESER.